(12) United States Patent
Cianci

(10) Patent No.: US 9,527,677 B2
(45) Date of Patent: Dec. 27, 2016

(54) METHOD AND DEVICE FOR ORIENTING CONTAINERS

(75) Inventor: Enio Giovanni Cianci, Sambuceto di S. Giovanni Teatino (IT)

(73) Assignee: Fameccanica.Data S.p.A., Pescara (IT)

( * ) Notice: Subject to any disclaimer, the term of this patent is extended or adjusted under 35 U.S.C. 154(b) by 201 days.

(21) Appl. No.: 13/810,382

(22) PCT Filed: Jul. 8, 2011

(86) PCT No.: PCT/IB2011/053042
§ 371 (c)(1),
(2), (4) Date: Jan. 15, 2013

(87) PCT Pub. No.: WO2012/011010
PCT Pub. Date: Jan. 26, 2012

(65) Prior Publication Data
US 2013/0115039 A1 May 9, 2013

(30) Foreign Application Priority Data

Jul. 19, 2010 (IT) .............................. TO2010A0622

(51) Int. Cl.
*B21B 39/30* (2006.01)
*B65G 47/248* (2006.01)
*B65G 43/00* (2006.01)

(52) U.S. Cl.
CPC ............. *B65G 47/248* (2013.01); *B65G 43/00* (2013.01)

(58) Field of Classification Search
CPC ..... B65G 47/244; B65G 47/248; B65G 33/02; B65G 47/84; B65B 21/00

USPC ................................ 414/754, 764, 816, 777
See application file for complete search history.

(56) References Cited

U.S. PATENT DOCUMENTS

| | | | | |
|---|---|---|---|---|
| 2,984,364 A | * | 5/1961 | Lamb ...................... | B65B 27/08 414/676 |
| 3,089,598 A | * | 5/1963 | Temple .................... | B65G 7/08 414/758 |
| 3,541,751 A | * | 11/1970 | Quebe .................... | B65B 17/02 198/376 |
| 3,920,118 A | * | 11/1975 | Krooss ................. | B65G 47/244 198/395 |

(Continued)

FOREIGN PATENT DOCUMENTS

| | | |
|---|---|---|
| EP | 0 374 107 | 6/1990 |
| EP | 0 599 228 | 6/1994 |

(Continued)

OTHER PUBLICATIONS

International Search Report for PCT/IB2011/053042 mailed Mar. 3, 2011.

(Continued)

*Primary Examiner* — Michael McCullough
*Assistant Examiner* — Lynn Schwenning
(74) *Attorney, Agent, or Firm* — Nixon & Vanderhye P.C.

(57) ABSTRACT

The containers (B) comprised in an incoming flow of containers advancing in a given direction along an axis (XB), wherein the containers (B) may present with a first orientation or else a second orientation with respect to the direction of advance and with a first posture or else a second posture, are oriented so as to generate an outgoing flow of containers (B), in which, for example, the containers all present in a vertical position with an identical orientation.

11 Claims, 3 Drawing Sheets

(56) References Cited

U.S. PATENT DOCUMENTS

Figure 1:
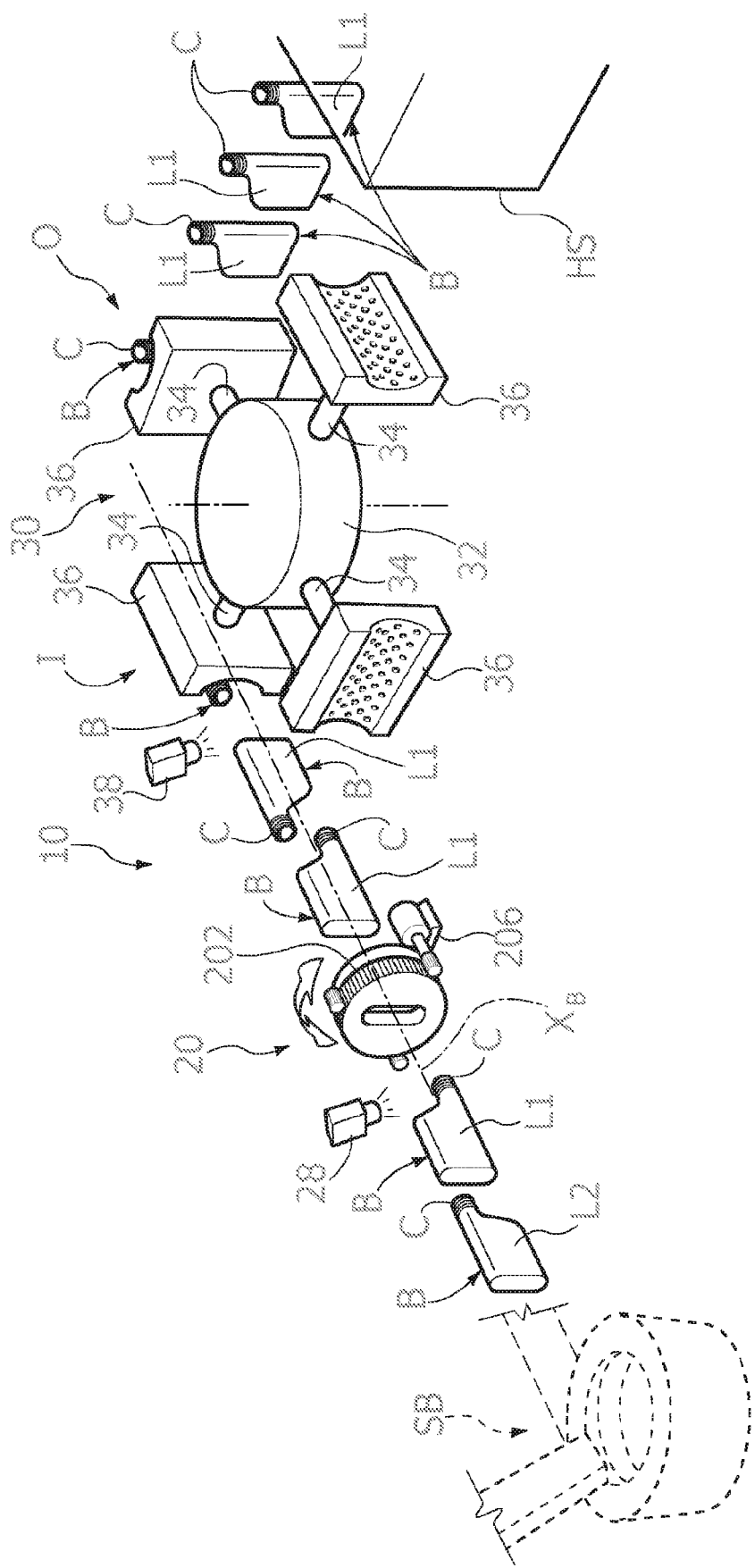

| | | | | |
|---|---|---|---|---|
| 4,149,621 | A | * | 4/1979 | Sollenberger et al. ........ 198/395 |
| 4,261,680 | A | * | 4/1981 | Carnley et al. ............... 414/421 |
| 4,308,943 | A | * | 1/1982 | Gierhart ........................ 198/399 |
| 4,699,564 | A | * | 10/1987 | Cetrangolo .......... B65G 47/248 |
| | | | | 125/35 |
| 4,854,442 | A | * | 8/1989 | Krooss .......................... 198/400 |
| 5,427,224 | A | * | 6/1995 | Suehara et al. ............... 198/396 |
| 5,980,191 | A | * | 11/1999 | Trible ........................ 414/746.7 |
| 6,000,902 | A | * | 12/1999 | Mueller et al. ............... 414/758 |
| 7,175,017 | B2 | * | 2/2007 | Carey et al. ........... B65G 13/12 |
| | | | | 198/401 |
| 7,357,244 | B2 | * | 4/2008 | Grewe ........................ 198/460.1 |
| 7,467,705 | B2 | * | 12/2008 | Lutz et al. .................... 198/598 |
| 2006/0131129 | A1 | | 6/2006 | McNear |
| 2009/0166154 | A1 | * | 7/2009 | Baldanza et al. .......... 198/419.2 |
| 2009/0218193 | A1 | * | 9/2009 | Malini .......................... 198/379 |

FOREIGN PATENT DOCUMENTS

| | | | |
|---|---|---|---|
| EP | 1 947 037 | | 7/2008 |
| JP | 2006 256744 | * | 9/2006 ............. B65G 47/24 |
| WO | WO 00/75051 | | 12/2000 |

OTHER PUBLICATIONS

Written Opinion of the International Searching Authority mailed Mar. 3, 2011.

\* cited by examiner

METHOD AND DEVICE FOR ORIENTING CONTAINERS

This application is the U.S. national phase of International Application No. PCT/IB2011/053042 filed Jul. 8, 2011 which designated the U.S. and claims priority to IT TO2010A000622 filed 19 Jul. 2010, the entire contents of each of which are hereby incorporated by regference.

TECHNICAL FIELD

The present disclosure relates to techniques for orienting containers.

The disclosure has been developed with particular attention paid to its possible use for orienting containers such as bottles or the like.

TECHNOLOGICAL BACKGROUND

In various sectors of application, for example in the sector of automatic-packaging lines, there arises the need to bestow a predetermined orientation on containers, for example, containers having a neck part such as bottles, flasks and the like.

Apart from having the traditional cylindrical shape, with the neck part aligned with the main central axis of the body, containers of this nature can present particular morphological characteristics, such as, for example, a flattened shape, side walls having various profiles, and/or the neck part set in an eccentric way, so that—to carry out in an automatic way operations such as labelling, filling, closing (topping), boxing—it is necessary to arrange the containers previously in a flow of containers all in the same position (for example, with the neck part facing upwards) and/or with the same orientation (for example, with each of the major faces set on a given side with respect to the direction of advance). This need contrasts with the fact that (for example, in the case of containers made of moulded and/or blown plastic) the containers are made available in bulk form, for example in bags or basket-like containers.

In order to treat containers of this nature it is known to resort to feeding structures (at times referred to as "sorting bowls") comprising a bowl-shaped rotary hopper, in which the containers, loaded randomly at the centre of the hopper, pile up against and rise gradually along the peripheral wall to exit from the mouth edge of the bowl in a flow of containers lined up one after another. A structure of this type is described, for example, in EP-A-0 374 107.

The containers positioned in a way considered other than correct can be eliminated from the outgoing flow via deflectors or shaped elements, for example so as to be once again introduced into the hopper.

A solution of this sort may prove satisfactory, for example, when in an outgoing flow of containers arranged in a horizontal direction and lengthwise there appears every so often a container set crosswise or standing up, i.e., when the containers to be rejected and possibly re-introduced into the hopper are in a small number.

Said solution can, instead, present at least a certain degree of criticality if the percentage of the containers to be rejected increases.

Added to these aspects, which are in themselves already critical, is then the further element of criticality represented by the fact that also containers considered as being set in an acceptable position can require being re-oriented for undergoing further handling operations.

For example, the containers comprised in a flow of containers arranged in a horizontal direction and lengthwise can require being turned all in the same position (for example, with the neck part facing upwards) and/or with the same orientation (for example, with each of the major faces set on a given side with respect to the direction of advance) so as to proceed in an automatic way to operations such as labelling, filling, closing (topping), boxing.

For this purpose, it is known to resort to handling systems that are rather complex, which comprise a station that performs turning over the containers into a vertical position an then loading them on a carousel structure in which each individual container is set on a rotary platform. Here, the containers that do not have the desired orientation are made to turn by the aforesaid platforms whilst the neck parts are engaged by spindles that are made to descend from above to prevent the containers from falling.

OBJECT AND SUMMARY

Various exemplary embodiments have the purpose of performing the action of orientation described previously with a solution that is simple and can work at high operating rates (even various hundreds of articles per minute).

In various embodiments, said purpose is achieved thanks to a method having the characteristics recalled in the ensuing claims. Various embodiments regard also a corresponding device.

The claims form an integral part of the technical teaching provided in relation to the invention.

BRIEF DESCRIPTIONS OF THE FIGURES

Figure 2:
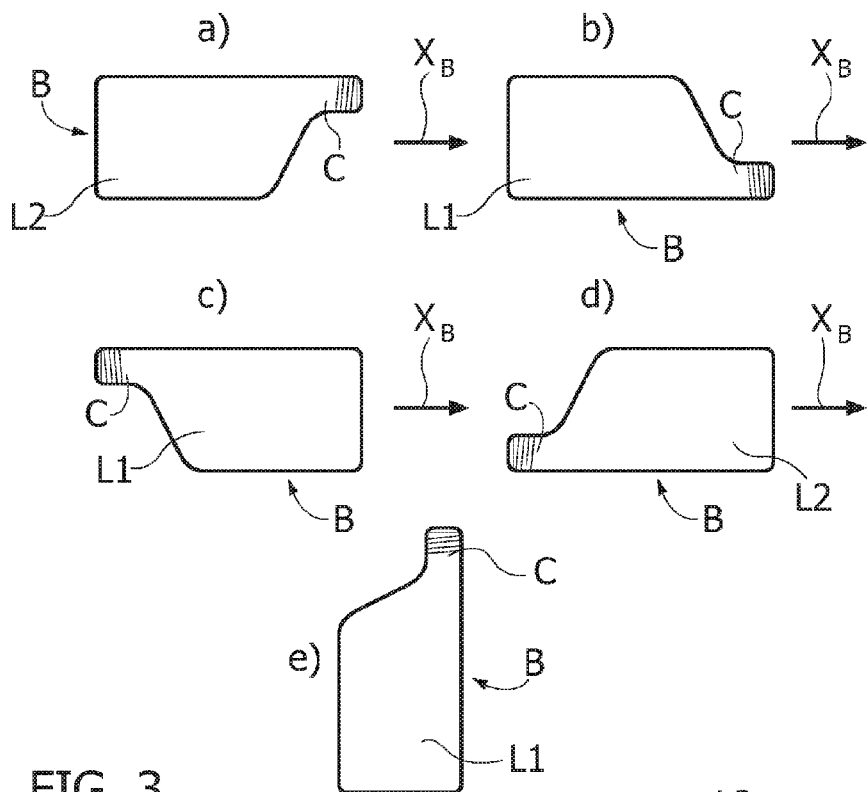
Figure 3:
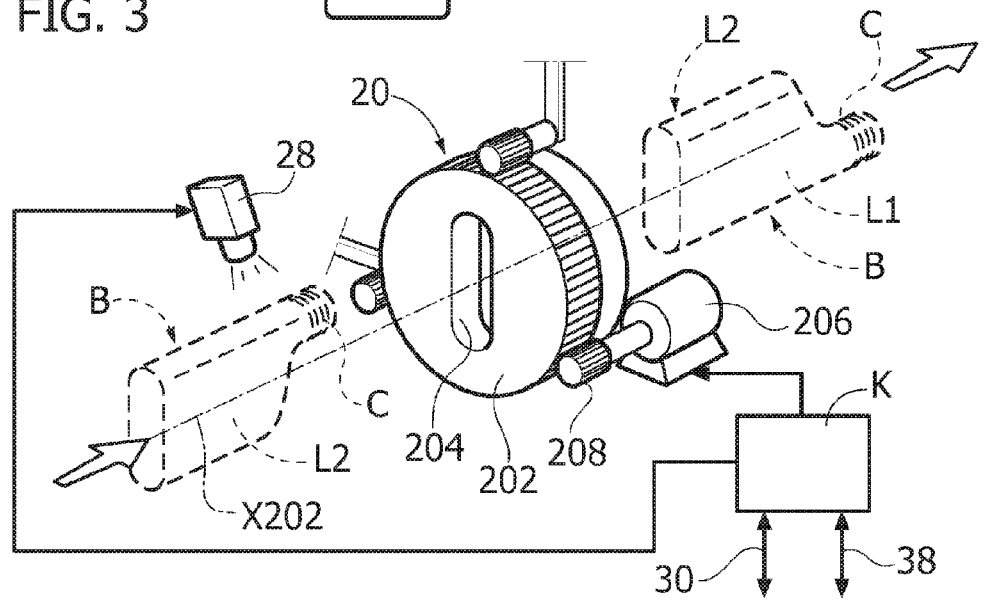
Figure 4:
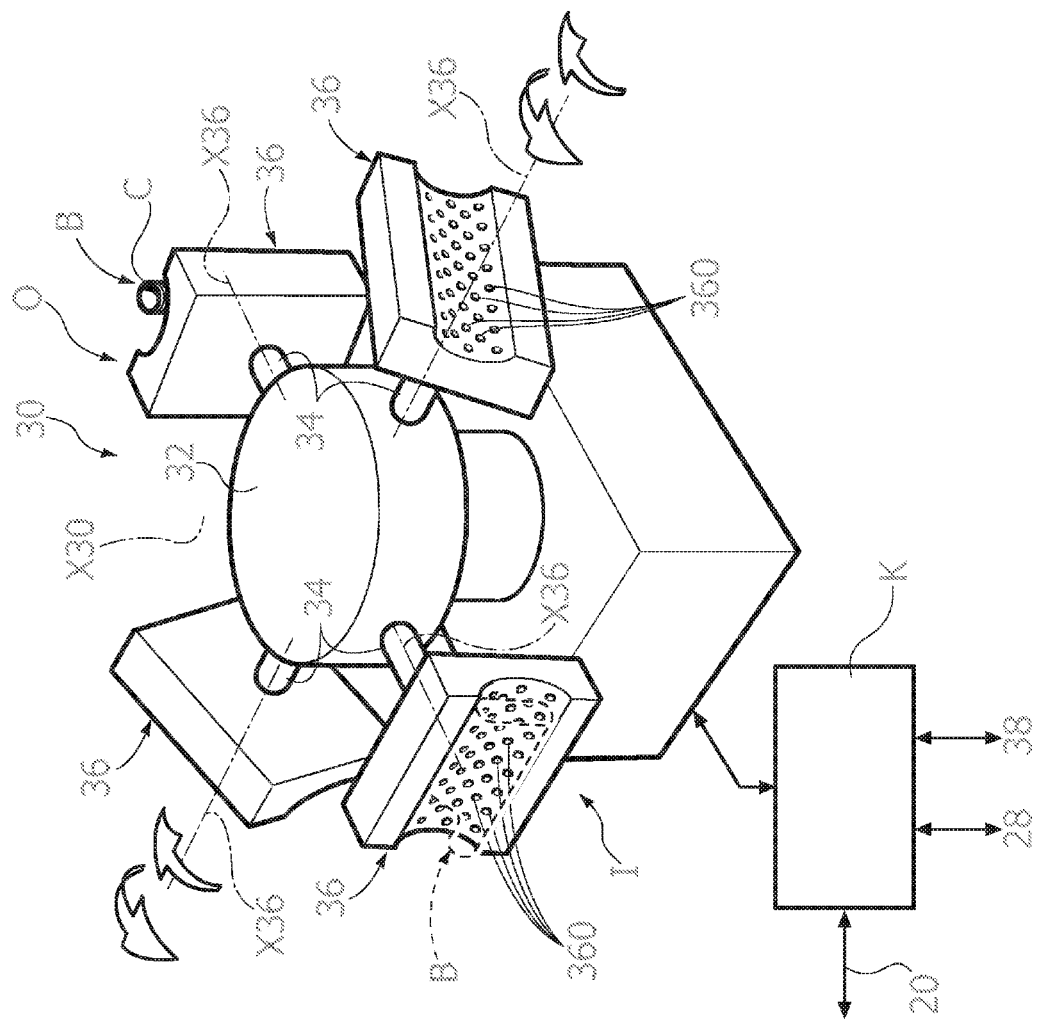

The invention will now be described, purely by way of non-limiting example, with reference to the annexed figures, wherein:

FIG. 1 is a schematic illustration of an embodiment;

FIG. 2, comprising five parts designated respectively by a), b), c), d) and e), represent the purposes pursued by various embodiments; and FIGS. 3 and 4 illustrate operation of a part of an embodiment.

DETAILED DESCRIPTION

In the ensuing description various specific details are illustrated aimed at an in-depth understanding of the embodiments. The embodiments can be provided without one or more of the specific details, or with other methods, components, materials, etc. In other cases, known structures, materials, or operations are not illustrated or described in detail so that the various aspects of the embodiments will not be obscured.

Reference to "an embodiment" or "one embodiment" in the framework of this description is meant to indicate that a particular configuration, structure, or characteristic described in relation to the embodiment is comprised in at least one embodiment. Hence, phrases such as "in an embodiment", or "in one embodiment" that may be present in different points of this description do not necessarily refer to one and the same embodiment. Moreover, particular conformations, structures, or characteristics can be combined in any adequate way in one or more embodiments.

The references used herein are provided purely for convenience and hence do not define the sphere of protection or the scope of the embodiments.

FIG. 1 illustrates the general structure of a device 10 for conveying/handling containers B represented, in the example considered herein, by bottles or flasks having a flattened shape. To clarify our ideas, without this implying any limitation of the scope of the embodiments, these may be bottles or flasks B made of plastic material coming from a so-called sorting bowl SB that are to be fed to a handling station HS constituted, for example, by a labelling station, a filling station, etc.

The containers B may, for example, be bottles or flasks made of moulded and/or blown plastic for containing shampoo, liquid soap, detergents, or other products for cleaning and hygiene.

In what follows it will be assumed, by way of example, that the containers B present an as a whole flattened shape with a neck part or mouth C (which is to receive a closing top) set in a lateral position, hence eccentric with respect to the body of the container.

In the example considered herein, as has been said, at output from the source (for example, the sorting bowl SB) that feeds an incoming flow of containers B to the device 10, the containers B may hence present in at least four different conditions, as represented, by way of example, in the four parts of FIG. 2 designated by a), b), c) and d).

For example (assuming that the containers B advance towards the device 10 along a horizontal axis $X_B$ and from left to right as viewed in FIG. 2), the containers B may present:

with the neck part C facing forwards (FIG. 2a and FIG. 2b) or else with the neck part C facing backwards (FIG. 2c and FIG. 2d); and with the neck part C facing upwards (FIG. 2a and FIG. 2c) or else with the neck part C facing downwards (FIG. 2b and FIG. 2d).

If we assume that the two major sides or faces of the container can be defined respectively as side 1 (or L1) and side 2 (or L2), to the four possible conditions of arrival at the device 10 there correspond:

two possible senses of advance: neck part C facing forwards (FIGS. 2a and 2b), and neck part C facing backwards (FIGS. 2c and 2d); and two possible lies or postures: side L1 facing the observer (FIGS. 2b and 2c), and side L2 facing the observer (FIGS. 2a and 2d).

(This fact may be immediately appreciated if we note that, with respect to the body of the container B considered as being set standing up, in FIGS. 2b and 2c the neck part C is on the right of the body, whereas in FIGS. 2a and 2d the neck part C is on the left of the body).

The considerations made previously are on the other hand irrespective of whether the two sides or faces L1 and L2 are different from one another (for example, as a result of the asymmetric location of the neck part C): the two sides or faces L1 and L2 could in fact be considered distinct from one another, for example, owing to a different finish (smooth/corrugated), a different colouring or degree of transparency, or even just a different use (front face/rear face).

It will be noted that substantially similar considerations would apply also in the case where the containers B arrive at the device 10 set flat.

Also in this case, to the four possible conditions of arrival at the station 20 there would correspond two verses (neck part facing forwards or facing backwards) and two possible lies or postures, namely:

side L1 facing upwards and side L2 facing downwards; and side L1 facing downwards and side L2 facing upwards.

As illustrated once again by way of example in FIG. 2e and in the right-hand part of FIG. 1, it is desirable for the containers B to present at the handling station HS in a flow of containers all standing up, i.e., set in a vertical position with the neck part C facing upwards, and moreover with a predetermined orientation with respect to the direction of advance: for example, with the neck part C set (once again with reference to the direction of advance) forwards, i.e., with the side or face L1 facing to the right of the path of advance towards the station HS and the side or face L2 facing to the left of the path of advance towards the station HS.

It is emphasized that this choice has a purely exemplary nature: the location and/or orientation of the containers B leaving the device 10 could in fact be different, for example with the neck part facing downwards (for instance, to proceed to a washing cycle) and/or with the side or face L1 facing to the left of the path of advance towards the station HS and the side or face L2 facing to the right of the path of advance towards the station HS, i.e., with reference ideally to the part on the right of FIG. 1, with the neck part C set backwards with respect to the direction of advance instead of forwards (as represented in FIG. 1).

The device 10 illustrated herein hence has the function of causing, whatever the conditions of feed of the containers C leaving the source SB (two possible senses and two possible postures), the containers B to present at the station HS in a regular or substantially regular flow—in various embodiments there may be a regular flow of containers B at equal distances from one another—of containers all oriented in the same way, i.e., with reference to the exemplary embodiment illustrated here (which, it is emphasized, is merely an example), all in a vertical position with the neck part C set (once again with reference to the direction of advance) forwards, i.e., with the sides L1 and L2 facing, respectively, to the right and to the left with respect to the path of advance towards the station HS.

In various embodiments, the device 10 comprises two stations 20 and 30, set cascaded to one another in the direction in which the containers B advance through the device 10.

According to the action performed by them, said stations may be referred to as:

overturning station (station 20); and rotation station (station 30).

It will on the other hand be appreciated that, in various embodiments, the overturning station 20 can be used alone (the rotation of the containers B in a vertical position not being required) or else be used in combination with rotation means different from the station 30 described herein (with rotation of the containers B into a vertical position achieved with other means).

In various embodiments, the overturning station 20 has the purpose of causing the containers B to present, at output from of the station 20, all with one and the same desired lie or posture, whatever the lie or posture of the incoming containers, i.e., whether in the case of containers B arriving set "edge-on", with the side L1 on the right of the path of advance and the side L2 on the left of the path of advance (FIGS. 2b and 2c) or else with the side L2 on the right of the path of advance and the side L1 on the left of the path of advance (FIGS. 2a and 2d), or in the case of containers B arriving set "flat", with the side L1 facing upwards and the side L2 facing downwards or else the side L2 facing upwards and the side L1 facing downwards.

In the exemplary embodiment considered herein (which, it is emphasized, is merely an example) the posture chosen as desired posture is the one with the side L1 on the right of the path of advance (FIGS. 2b and 2c).

It will be appreciated that said choice is purely provided by way of example, in so far as it would be in itself possible to choose, as desired posture at output from the station 20, for example:

the lie opposite to the one referred to previously, i.e., with the side L2 on the right of the path of advance (FIGS. 2a and 2d);

one between two possible horizontal lies (side L1 or else side L2 facing upwards);

yet another lie, for example with the containers set in an oblique position with respect to the horizontal.

If we assume, by way of example, that the posture chosen as desired posture is the one with the side L1 on the right of the path of advance (FIGS. 2b and 2c), the station 20 may operate:

by leaving unaltered the posture of the containers B that already have said posture at output from the source SB; and by instead overturning through 180° about the direction of advance $X_B$ those containers B that present the opposite posture, i.e., the one with the side L2 on the right of the path of advance (FIGS. 2a and 2d).

In practice, with reference to the example considered herein, the station 20 intervenes:

by causing the containers that arrive in the conditions represented in FIGS. 2b and 2c to pass on, without turning them; and by turning through 180° about the axis $X_B$ the containers that arrive in the conditions represented in FIGS. 2a and 2d, causing them, at output from the station 20, to be, respectively, in the conditions represented in FIGS. 2b and 2c (i.e., 2a>>>2b and 2d>>>2c).

In the case (mentioned previously and not explicitly visible in the drawings) where the containers B present at input to the device 10 arranged flat, the station 20 intervenes on all the containers B of the incoming flow by imparting thereon movements of overturning about the axis $X_B$, for example in opposite directions so as to arrive at the posture considered herein, by way of example, as desired posture for being fed to the station 30, i.e., the posture with the side L1 on the right of the path of advance (FIGS. 2b and 2c).

It will be appreciated that dual considerations, altogether identical, would apply in the case where the posture chosen as desired posture were the posture with the side L2 on the right of the path of advance (FIGS. 2a and 2d).

Once again, it will be appreciated that the axis $X_B$ could have an orientation different from the horizontal.

In various embodiments, the modes of operation described above can be achieved envisaging, within the station 20, a rotary guide 202 that may be constituted, for example, by a circular plate having a certain thickness (for example, some tens of millimetres) traversed by a slot 204 having the profile at least roughly complementary to the cross-sectional profile (which may not be constant) of the containers B. In the example considered herein, it is a slot 204 having a flattened shape, with the profile that is approximately rectangular with the sides at least slightly concave.

The guide 202 (and hence the slot 204) may be made to turn about an axis $X_{202}$, for example by an electric motor 206 that draws in rotation a pinion 208 that is able to mesh with gear teeth 202a made on the edge of the disk-shaped plate 202 defining the guide.

The motor 206 acts under the control of a processing unit K (for example, a personal computer for industrial use), also coming under which is a viewing unit 28 constituted, for example, by a video camera that films the containers B entering the device 10, hence entering the station 20.

The video signal of the unit 28 is processed by the unit K, which supervises operation of the device 10 as a whole, with the consequent possibility of identifying the posture of each incoming article B and of governing the motor 206 for driving (according to the modalities described previously) the movement of overturning of the containers B about the axis $X_{202}$, which in use is aligned with the axis $X_B$ of advance of the containers. The aim of this is to achieve, whatever the posture of the incoming containers B, the desired posture at output from the station 20.

The profile of the slot 204 is such that the containers B, which advance in the device 10 drawn by a conveying system (for example, a motor-driven belt conveyor with a number of sections, not explicitly visible in the drawings and of a known type), are able to pass through the guide 202, penetrating into the slot 204 and constituting a slack shape fit therewith.

While the individual article B advances through the guide 202, the possible rotation of the guide 202 itself (drawn in rotation by the motor 206 governed by the unit K, according to the detection signal of the viewing unit 28) enables the desired re-orientation to be achieved without interrupting the movement of advance of the containers B.

The containers B entering the device 10 that already have the desired posture simply pass through the guide 202, which is kept stationary, since there is no need to carry out any operation of re-orientation.

The guide 202 can be replaced (also automatically, by resorting to a turret structure) with guides having slots 204 variously shaped so as to be able to configure the station 20 for the operation of re-orientation of containers B of different dimensions and shapes, performing the operation commonly referred to as "change of format".

In the case of particular geometries of container, for example containers B having a tapered profile, the direct shape fit to enable the movement of overturning about the axis $X_{202}$ may prove too tight to enable the guide 202 to be traversed freely by the containers B. In various embodiments, it may thus be envisaged that the guide 202, instead of having a fixed geometry, has a variable geometry, for example being provided with one or two moving elements that can engage the container B laterally to enable drawing thereof when it is being turned over and then again open up to enable the guide 202 to be traversed freely by the containers B, at most with a slight deceleration of the movement of advance along the axis $X_{202}$.

Apart from the specific example of embodiment considered herein, it will likewise be appreciated that, in various embodiments, the overturning station can comprise a body 202 that can be turned over about the axis defining the direction of advance of the incoming containers $X_B$, with the aforesaid body having an opening 204 that can be traversed by the incoming flow of containers and that may be able to obtain with the containers B of the incoming flow of containers traversing the opening a coupling in rotation about the aforesaid direction of advance.

In various embodiments, the body 202 that can be turned over can be disk-shaped with the opening 204 having an elongated shape.

In various embodiments, there may be provided a plurality of said bodies that can be turned over 202 having openings 204 of various shapes and/or dimensions. As has already been said, the axis $X_B$ (and hence the axis $X_{202}$) could have an orientation different from the horizontal.

In the examples of embodiment considered herein said choice, which is not imperative, is linked to the fact that the rotation station 30 comprises a carousel structure that turns about an axis $X_{30}$ oriented in a vertical direction.

However, the geometry of handling/orientation of the containers B illustrated herein can remain substantially unaltered also in the case where the axis $X_B$ (and hence the axis $X_{202}$) has an orientation different from the horizontal one and the axis $X_{30}$ has an orientation different from the vertical one.

In various embodiments, the overturning structure has a motor-driven carousel structure, which can turn about the axis $X_{30}$ with a rotary element 32 mounted on the periphery of which are one or more radial arms 34 (for example, a number of radial arms set at angular distances apart, four in number in the example illustrated herein), each of which carries at its distal end a gripping formation 36 able to grip the containers B in the posture (rendered identical for all containers B) in which they are at output from the station 20.

In various embodiments, set between the station 20 and the means for rotation into the vertical position (exemplified here by the station 30), are handling means that are able to regulate the rate and/or phase of feed of the containers B.

Handling means of this type (for example, motor-driven belt conveyors, for instance with double belt) are well known in the automatic-packaging industry, so that any further detailed description herein is superfluous.

In various embodiments, the gripping formations 36 are vacuum gripping formations; namely, they are able to perform on the containers B an action of gripping by negative pressure (as a result of a "vacuum-cleaner" effect, so to speak) presenting for thing purpose in the form of bodies that are as a whole plane, for example with an end face at least slightly channelled, giving out in which are openings 360 that can be selectively connected to a source of sub-atmospheric pressure.

In addition to this, each formation 36 is mounted on the element 32 with the capacity of turning about an axis $X_{36}$ oriented in a radial direction with respect to the element 32 itself, hence with respect to the axis $X_{30}$.

Also the station 30 (if present and whatever way built) can be governed by the control unit K, in order to operate, for example, in such a way that each of the gripping formations 36 may:
  pick up a container B at an angular gripping position (designated by I in FIGS. 1 and 4) corresponding to the outlet of the overturning station 20;
  get the container B thus picked up to follow an orbital path about the axis of rotation $X_{30}$ such as to bring the container B itself into an angular unloading position (designated by O in FIGS. 1 and 4) enabling feed thereof to the station HS; and
  imparting at the same time on the container B itself, during transport from the angular gripping position I to the angular unloading position O and thanks to the capacity of rotation of the gripping formation 36 about the respective axis $X_{36}$, a movement of rotation through 90° such as to bring the container B, received in a horizontal position corresponding to the gripping position I, to be delivered in a vertical position at the unloading position O, to be then sent on to the handling station HS.

Devices structurally similar to the station 30 described previously are known in the industry of automatic handling of articles, for example for handling hygienic-sanitary containers such as sanitary pads and the like, where the gripping formations 36 are at times referred to as "shoes". In particular, devices of this type are illustrated, for example, in EP-A-1 947 037.

This applies in particular as regards the motor means (for example, electric servo motors mounted in the rotary structure 32), which enable the movement of rotation to be imparted on the arms 34 that carry the "shoes" 36 about the respective axes $X_{36}$.

In various embodiments the direction of the movement of rotation imparted on the gripping formations 36 about the respective axes $X_{36}$, instead of being fixed, is selectively variable, according to the sense or orientation (i.e., the neck part C facing forwards or facing backwards) with which the containers B present at input to the overturning station 30.

Said orientation in one sense or in the other can be detected via a further visual inspection unit 38, which can be assumed herein as being identical to the unit 28 already described previously.

Since when the containers B pass through the station 20, their sense is not changed (even following upon the movement of overturning that may have been imparted on the containers B themselves about the axis $X_B$ to change the posture thereof), in various embodiments the function of the two units 28 and 38 can be combined in just one unit 28, which, when it detects the posture of a container B at input to the overturning station 20, is also able to detect the sense of advance thereof so as to indicate to the processing unit K whether the container in question is with the neck part set forwards or with the neck part set backwards.

According to the sense detected (by the unit 38 or, possibly, already by the unit 28) the unit K is able to establish whether the desired final vertical orientation, with the neck part C facing, for example, upwards, is to be achieved by governing the movement of rotation of the respective shoe 36 about the respective axis $X_{36}$ in the clockwise direction or else in the counterclockwise direction.

For example, if we assume considering the direction of rotation of the shoes 36 about the axis $X_{36}$ with reference to an ideal observation of the shoes 36 starting from the centre of the rotary structure 32 (and if we assume choosing as desired posture at output from the station 20 the one with the side L1 on the right of the path of advance—FIGS. 2b and 2c):
  imparted on the shoes 36 that receive the containers B arriving at the station 30 with the neck part facing forwards (FIG. 2b) is a movement of rotation (through 90°) in the counterclockwise direction; and
  imparted, instead, on the shoes 36 that receive the containers B arriving at the station 30 with the neck part facing backwards (FIG. 2c) is a movement of rotation (through 90°) in the clockwise direction.

In either case, the final result is to send on to the station HS a flow of containers B all oriented in the same way, i.e., for example, all in a vertical position with the neck part C set (once again with reference to the direction of advance) forwards, i.e., with the sides L1 and L2 facing, respectively, on the right and on the left with respect to the path of advance towards the station HS.

If, instead of the posture of FIGS. 2b and 2c, at output from the station 20 the opposite lie of FIGS. 2a and 2d were chosen as desired posture, by imparting on the shoes 36 that receive the containers B arriving at the station 30 with the neck part facing forwards (FIG. 2a), a movement of rotation (through 90°) in the counterclockwise direction, and on the shoes 36 that receive the containers B arriving at the station 30 with the neck part facing backwards (FIG. 2d), a movement of rotation (through 90°) in the clockwise direction, at output from the station 30 there would be obtained a flow of containers B advancing towards the station HS oriented in a vertical position with the neck part C set (once again with reference to the direction of advance) backwards, i.e., with the sides L1 and L2 facing respectively on the left and on the right with respect to the path of advance towards the station HS.

The reversal of the direction of rotation of the shoes 36 would have, instead, enabled, in either case, orientation of the containers B with the neck part C facing downwards (for example, to undergo a washing operation).

Without prejudice to the criteria of handling described, similar results could be obtained also by getting the containers B to leave the station 20 set flat (i.e., with in containers B no longer in a vertical direction but in a horizontal direction, with the face of larger dimensions vertical but on the long side by choosing as desired posture the posture with the side L1 facing upwards and the side L2 facing downwards or else the posture with the side L2 facing upwards and the side L1 facing downwards and setting the station 30 with its axis of rotation $X_{30}$ horizontal.

It will be appreciated that the exemplary of embodiment considered herein do not pose particular constraints on the relative angular location of the position of gripping I and the position of release O of the containers B: in FIG. 1 said positions I and O are set at 90° with respect to one another (so that the path of advance of the containers B towards the station HS is orthogonal to the path of exit of the containers B from the overturning station 20), whilst in FIG. 4 said positions I and O are at 180° with respect to one another.

Apart from the specific example of embodiment considered herein, it will likewise be appreciated that, in various embodiments, the rotation station 30 (if present and however built) can comprise at least one gripping element 36 mobile with an orbital movement between a position of gripping I of the containers B comprised in the flow of containers B all having the posture identified as desired posture and a position of release O of the containers in a vertical position with an identical orientation. In various embodiments, the gripping element 36 is able to perform (and to impart on the containers B on which is has to act) the aforesaid movement of rotation towards the vertical position, in the passage between the gripping position I and the position of release O.

In various embodiments, the rotation station 30 can comprise at least one arm 34 bearing a gripping element 36 at its distal end, the arm being orientable to impart on the gripping element 36 the aforesaid orbital movement between the gripping position I and the position of release O.

The example of embodiment considered herein envisages precisely the presence of a plurality of said gripping elements 36 included in the carousel structure visible in FIG. 4.

Consequently, without prejudice to the principle of the invention, the details of construction and the embodiments may vary, even significantly, with respect to what is illustrated herein purely by way of non-limiting example, without thereby departing from the scope of the invention as defined by the annexed claims.

The invention claimed is:

1. A method of orienting containers included in an input flow of containers advancing in a given direction, wherein the containers exhibit a first or a second sense of advance and a first or a second posture in said given direction, the method comprises:
    defining a desired posture for said containers in said input flow of containers,
    identifying, in said input flow of containers, the containers having a posture different from said desired posture,
    imparting to the containers thus identified a turnover movement around said given direction bringing them to said desired posture and obtaining a flow of containers all having said desired posture, wherein said turnover movement is imparted by means of a turnover station including a body adapted to be turned over around said given direction, said body having an opening to be traversed by said input flow of containers and to form with the containers in said input flow of containers traversing said opening a rotational coupling around said given direction,
    distinguishing the containers with said first sense of advance and the containers with said second sense of advance,
    imparting to said containers in said flow of containers all having said desired posture a rotation movement towards the vertical position, said rotation movement being imparted in opposed senses depending on whether the containers subjected to rotation towards the vertical position have said first or said second sense of advance,
    defining, as said desired posture for said containers in said input flow of containers, a posture different from said first and said second posture,
    imparting to all the containers in said input flow of containers said turnover movement around said given direction to bring them to said desired posture,
    whereby the method generates an output flow of containers wherein the containers are positioned vertically with a same orientation,
    wherein the same orientation means that both the posture and the sense of advance of all containers is the same.

2. The method of claim 1, comprising:
    defining, as said desired posture for said containers in said input flow of containers, one of said first and said second posture of said containers in said input flow of containers, and
    omitting to impart said turnover movement around said given direction to those containers in said input flow which already have said desired posture.

3. The method of claim 1, wherein said containers have a flattened shape overall, the method comprising defining said desired posture for said containers as a posture wherein said containers are arranged with their larger cross-sectional dimension arranged vertically.

4. The method of claim 1, comprising imparting to said containers in said flow of containers all having said desired posture said rotation movement towards the vertical position as a movement of rotation around a horizontal axis.

5. The method of claim 1, comprising distinguishing the containers with said first sense of advance and the containers with said second sense of advance in a flow selected out of:
    said input flow of containers, and
    said flow of containers all having said desired posture.

6. The method of claim 1, wherein said turnover movement around said given direction being imparted with opposite senses of rotation according to whether the containers in said input flow of containers have said first or said second posture.

7. A device for performing the method of claim 1, comprising:
   at least one viewing unit to identify, in said input flow of containers, the containers having a posture different from said desired posture, and
   a turnover station to receive said input flow of containers, said turnover station being coupled to said at least one viewing unit to identify, which imparts to said containers having a posture different from said desired posture a turnover movement around said given direction bringing them to said desired posture and obtaining a flow of containers all having said desired posture,
   wherein said turnover station includes a body adapted to be turned over around said given direction, said body having an opening to be traversed by said input flow of containers and to form with the containers in said input flow of containers traversing said opening a rotational coupling around said given direction, and
   at least one viewing unit to distinguish the containers with said first sense of advance and the containers with said second sense of advance, and
   a rotation station coupled to said at least one viewing unit to distinguish, which imparts to said containers in said flow of containers all having said desired posture a rotation movement towards the vertical position, said movement of rotation being imparted with opposite rotation senses depending on whether the containers subjected to rotation towards the vertical position have said first or said second sense of advance.

8. The device of claim 7, wherein said turnover body is disk-shaped with said opening being of elongated shape.

9. The device of claim 7, wherein said rotation station includes at least one pick-up member mobile of an orbital motion between a pick-up position of the containers in said flow of containers all having said desired posture and a release position of the containers in a vertical position with a same orientation, said pick-up member being adapted to perform said movement of rotation towards the vertical position when passing from said pick-up position to said release position.

10. The device of claim 9, comprising an arm carrying said pick-up member at its distal end, said arm to impart to said pick-up member said orbital movement between said pick-up position and said release position.

11. The device of claim 9, comprising a plurality of said pick-up members included in a carousel structure.

* * * * *